Aug. 26, 1952  A. P. SPECKIN  2,608,112
ADJUSTABLE MULTIPLE SPINDLE HEAD
Filed Dec. 16, 1949  2 SHEETS—SHEET 1

ALFRED P. SPECKIN
INVENTOR,

BY Joseph F. Zugelter
Atty.

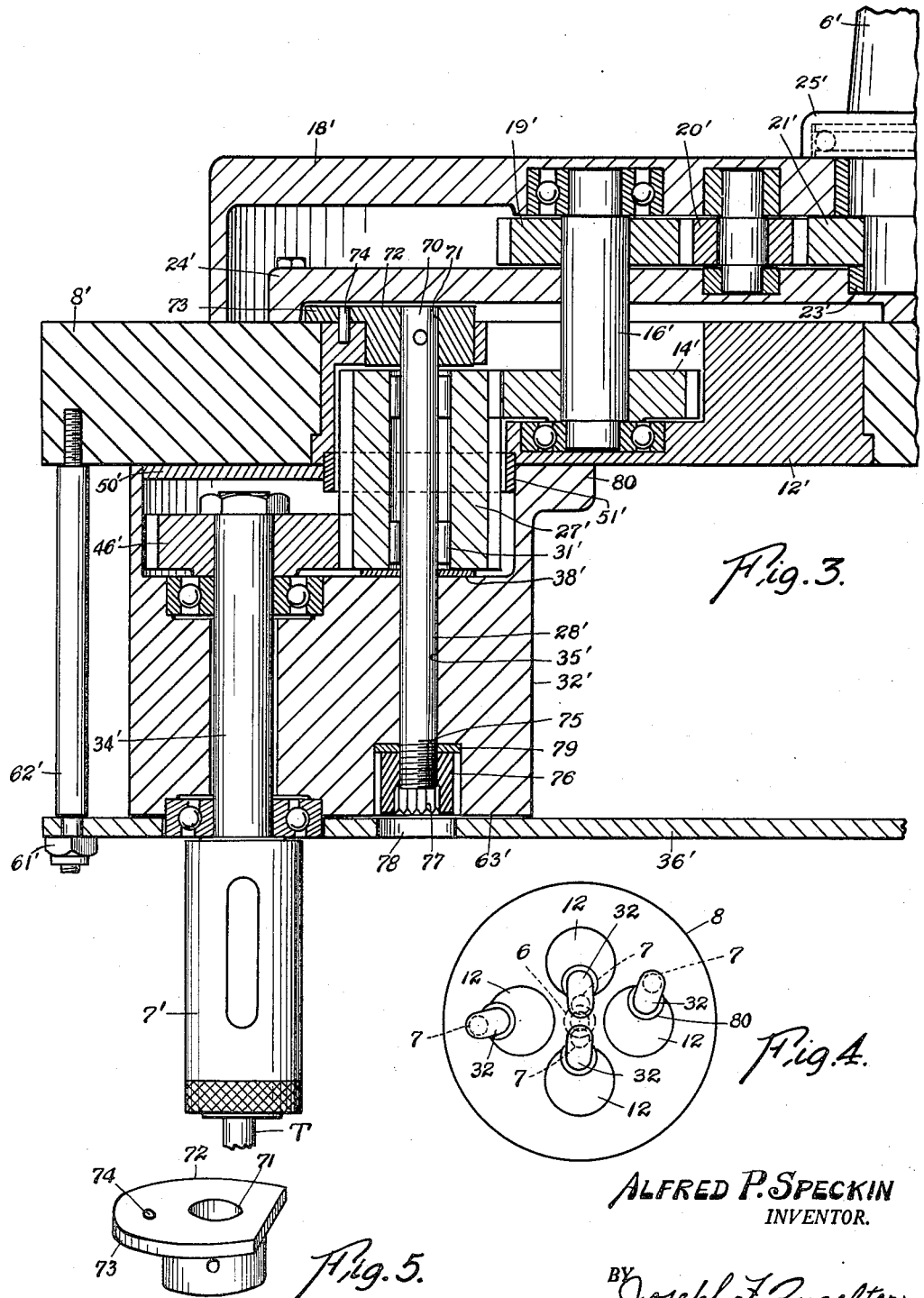

Patented Aug. 26, 1952

2,608,112

UNITED STATES PATENT OFFICE 2,608,112

ADJUSTABLE MULTIPLE SPINDLE HEAD

Alfred P. Speckin, Cincinnati, Ohio, assignor to United States Drill Head Co., Cincinnati, Ohio, a partnership Application December 16, 1949, Serial No. 133,337

17 Claims. (Cl. 77—24)

1

The present invention relates to an adjustable multiple spindle head for drilling machines, and is concerned particularly with the problem of furnishing adjustment means for the several spindles of the drill head, whereby said spindles each may be located at any desired position relative to the work-piece, for accurately drilling the work-piece, or performing other machine operations thereon, such as tapping, reaming, and the like.

One of the objects of the invention is to provide easily and quickly adjustable spindle structures for a multiple head, so designed as to attain a higher degree of accuracy in drilling or tapping, than has been possible with the use of any adjustable multiple spindle head heretofore proposed.

Another object of the invention is to improve the spindle housing design in the interests of rigidity, durability, and resistance to wearing of the parts.

Another object is to provide a multiple spindle structure of the character stated, having maximum flexibility in the locating of the spindles and their tools relative to the work-piece.

A further object is to provide effective and reliable clamping means for fixing the spindles relative to predetermined points on the work-piece to be operated upon.

Other objects of the invention are: to incorporate, in a machine of the character stated, a reduced number of constituent parts resulting in simplification of the head; to reduce the weight of the device; to simplify and expedite assembly of the device at the factory; to simplify and expedite adjustment of the spindles by the user of the device; and to provide for effective lubrication of all encased parts requiring lubrication.

The foregoing and other objects are attained by the means described herein and illustrated upon the accompanying drawings, in which:

Fig. 3 is a view similar to Fig. 1, showing a modification of the drill head.

Fig. 4 is a diagrammatic view, on a greatly reduced scale, of a typical multiple spindle head, and showing various adjusted positions of the tool spindles.

Fig. 5 is a perspective view of a clamp head, a part of the Fig. 3 device.

2

Figures 1, 2:
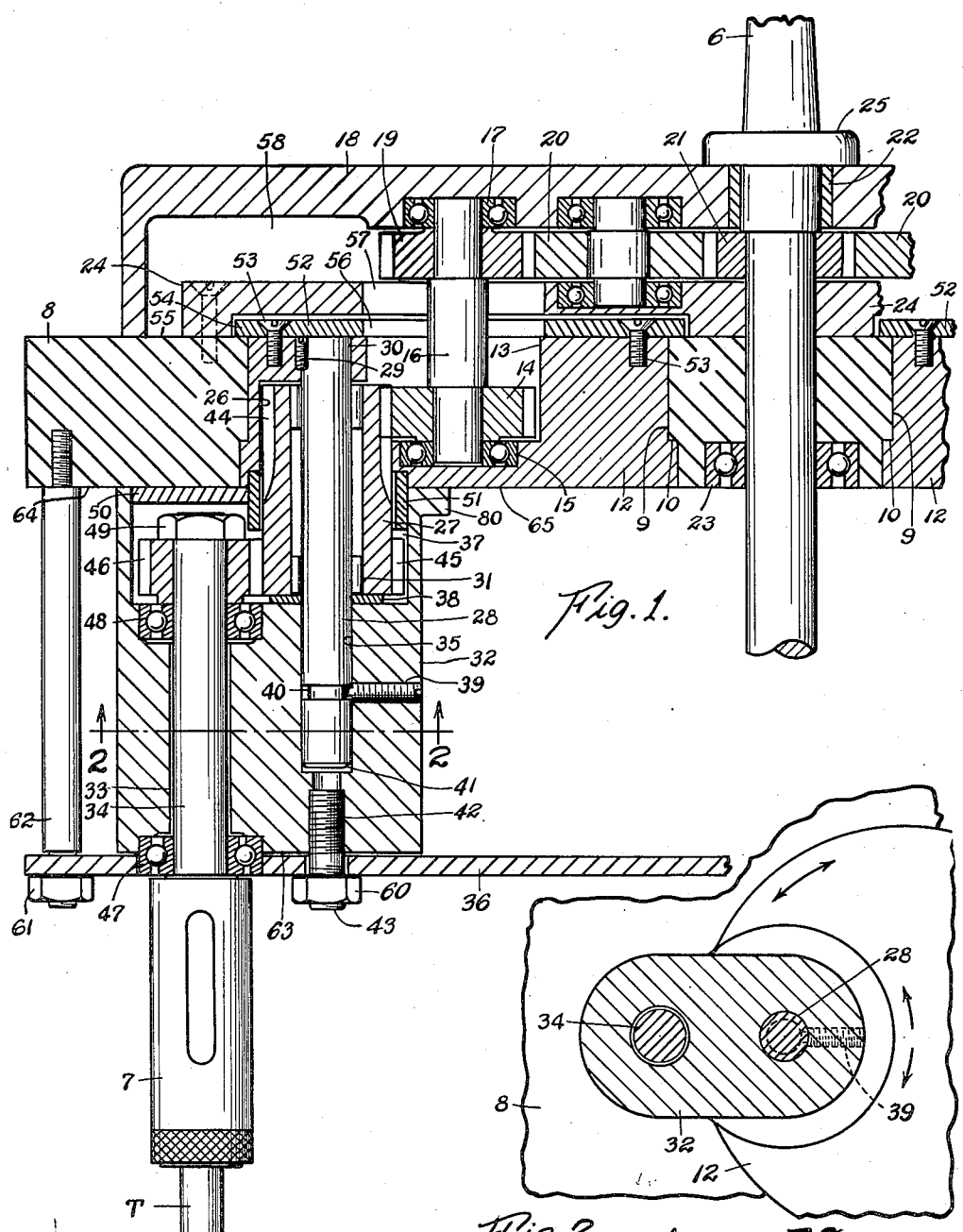
Fig. 1 is a fragmental cross-sectional view taken on a vertical plane passing through the center of the improved adjustable multiple spindle drill head of the invention.
Fig. 2 is a cross-sectional view taken on line 2—2 of Fig. 1.

As will be understood, the head herein disclosed is adapted for mounting upon the quill or other reciprocable part of an ordinary single spindle drilling machine, which latter includes a rotatable spindle socket to drivingly engage the tapered main shaft 6 of the head. Thus the head may be moved bodily toward and from a table supporting the work-piece, while at the same time the several spindles of the head are rotated in unison by the rotating spindle of the drilling machine, all in accordance with common practice in the art.

Referring now to Figs. 1 and 2 of the drawings, 7 indicates the tool spindle-socket or holder, to be rotated by the main shaft 6 through a train of gears to be described. The gear head which carries the tool holder 7 and its driving means, may carry additional tool holders as indicated at 7 upon Fig. 4, all driven from the same main shaft 6. Heads may be constructed with one or more adjustable tool holders, depending upon the size of the head and the nature of the work to be performed. In some instances, the head may carry one or more adjustable tool holders, and one or more non-adjustable tool holders, all driven from the same spindle. Moreover, the head may be circular as shown in the embodiment illustrated, or it may be made square or oblong, or of some other contour, as desired.

The gear head as usual, houses sets of spindle driving gears and may comprise a heavy flat metal plate or body member 8 (Fig. 1), of substantial thickness, furnished with transverse large bores 9 corresponding in number to the number of adjustable spindles and tool holders to be incorporated in the head. Each bore 9 may be counterbored as shown, to provide an annular shoulder 10 therein adapted to limit upward movement of a cylindrical drum or plug 12 fitted in the bore for rotational adjustment. The drum or plug 12 may conveniently be made the same thickness as the body member 8.

Drum 12 may be bored centrally thereof, as at 13, and counterbored, to accommodate a counter-shaft gear 14 and a bearing 15 for one end of the counter-shaft 16, the opposite end of said shaft being journaled in a suitable bearing 17 mounted upon a cover member 18 for the gearing. A second counter-shaft gear 19 is fixed to shaft 16 and occupies the space between the cover member and the body member of the head. Gear 14 also is fixed to the shaft 16, so that the shaft and the gears 14 and 19 may rotate in unison. As will readily be understood by referring to the drawing, the counter-shaft gears are driven from the main shaft 6 by means of the meshing gears 20 and 21, the latter being fixedly mounted upon the main shaft. The main shaft is journaled in one or more suitable bearings carried by the head. As shown in Fig. 1, the cover member 18 may carry a suitable bearing 22 for an intermediate portion of the shaft, whereas the lower end of the shaft extends downwardly into the body member or plate 8, where a suitable bearing 23 may be provided. Fig. 3 shows an obvious variation, at 23'. A thrust bearing for the main shaft is indicated conventionally at 25, and this as well as the bearings 22 and 23, may be of the anti-friction type. The lower end of the main shaft may be adapted to carry a drill or other tool, if desired.

From the under side, the drum 12 is drilled to provide an opening 26 receptive of an idler gear 27 in mesh with the counter-shaft gear 14. This idler gear is rotatable upon an idler shaft 28 which is rigidly attached to the drum 12 at its upper end. The mounting of the idler shaft upon the drum may be effected in any suitable manner, as by means of a screw 29 driven between the shaft and the wall of the opening 30 which receives the shaft. It is possible, of course, to make a drive fit between the shaft and the opening 30, or to effect the connection by means of screw threads or equivalent means. The shaft 28 is at right angles to the plane of the drum, and parallel to the counter-shaft 16. To provide for free rotation of idler gear 27 upon its shaft, roller bearings 31 or other anti-friction bearing means may be provided.

The character 32 indicates a spindle housing in the form of a block having a bore 33 accommodating the tool holder spindle shaft 34, and a second bore 35 receiving the idler shaft 28. These bores are parallel to one another and to the counter-shaft 16. The housing 32 is adapted to be swung about the idler shaft 28, when the locating plate 36 is removed, through a full 360 degrees. The drum 12 likewise may be rotated in its bore 9 and about the central shaft 16, to the extent of 360 degrees. These movements may be executed independently of one another, for the purpose of locating the tool holder 7 to an infinite number of points upon a work-piece adjacent the tool holder.

In the embodiment illustrated by Fig. 1, the housing 32 is bored at 37 to accommodate the lower end of the idler gear 27, the gear resting upon a washer 38 at the base of the bore. The idler shaft 28 fits loosely in the bore 35 of the spindle housing, so that the housing may be swung about said shaft, and to prevent the housing from dropping off the lower end of the idler shaft, a suitable retaining means may be provided, for example, in the form of a pivot point screw 39 having its inner end riding in an annular groove 40 of the shaft. The lower end of the idler shaft is indicated at 41, and it may substantially bottom in the bore 35, as shown. An extension 42 of the bore 35 is internally threaded as indicated, whereby a stud 43 may be securely anchored in the spindle housing for a purpose to be explained.

As the drawing clearly indicates, the uppermost teeth 44 of idler gear 27 are constantly in mesh with the teeth of counter-shaft gear 14, whereas the lowermost teeth 45 are in constant mesh with the teeth of a spindle gear 46 which is fast on the spindle shaft 34. The tool holder 7, of course, is fast on the spindle shaft or made integral therewith. Suitable bearings 47 and 48 mounted in the counter-bored ends of the spindle housing, provide the necessary lateral support for the rotating spindle shaft. A nut 49 threaded onto the upper end of the spindle shaft provides for easy replacement of spindles by simply removing the locating plate 36, loosening the screw 39 to drop the housing 32, and removing the cover disc 50 which permits access to the spindle nut. An annular or cylindrical bushing 51 fits partly into the housing bore 37 and partly into the drum bore 26, to establish an effective swivel connection between the spindle housing and the drum.

Suitable means are to be provided for precluding downward displacement of drum 12 from its bore 9 in the body member. This may be accomplished in various ways, as by means of a circular disc or ring 52 fastened as at 53 to the upper face of the drum, with the marginal edge 54 of the disc or ring overlying and resting upon the upper face 55 of the body member 8. The upper faces of the body member and the drums are preferably coplanar, as previously stated, to simplify retention of the drums by their respective retaining rings or discs 54. It may be noted that the rings or discs 54 and the bearing plate 24 are perforated at 56 and 57 to facilitate assembly of the head and to ensure passage of lubricant from the gear housing space 58 to the several gears 14, 27, and 46, and their shaft and bearings.

When a drilling or tapping operation is to be performed, it is necessary to securely clamp the spindle housing against rotation about the idler shaft 28, and in fact against any movement whatever. In the Fig. 1 device, this clamping is effected by tightening the stud nut 60, which binds the relatively large area of the lower face 63 of the spindle housing securely against the rigid locating plate 36. It is to be understood that the locating plate will usually be substantially coextensive with the outline of body member 8, and will be suspended therefrom by means of a plurality of hanger bolts 62 having their upper ends anchored securely to the body member. The hanger nuts 61 on the lower ends of bolts 62 may be drawn up tightly enough, if desired, to force the upper end of the spindle housing into firm abutment with the lower faces 64 and 65 of the body member or head 8, and the drum 12, respectively, thereby to clamp the drum against possible rotation during the drilling or tapping operation.

The clamping means above explained is very simple and highly effective to ensure greater than usual accuracy in the performance of drilling and tapping operations. Of notable importance also, is the fact that the spindle housing directly above the spindle axis bears solidly against the heavy body member and the heavy drum 12, throughout the course of the drilling or tapping operation, thereby to eliminate completely any tendency to bend the idler shaft or otherwise distort the parts to throw the spindle and the tool off the exact vertical line of travel as the tool is driven forcefully into the work by descent of the head toward the work-piece. This is a highly important consideration in precision drilling, tapping, and reaming operations.

To adjust the spindle and tool holder to the requirements of different jobs, the operator removes the nuts 60 and 61, thereby releasing the locating plate for bodily removal from the hanger bolts 62. After the locating plate is removed, the spindle housing may be rotated about the idler shaft 28, and the drum 12 may be rotated in its bore 9 to revolve the idler shaft about the axis of countershaft 16 as indicated by the arrows applied to Fig. 2, thereby enabling the operator to position the tool holder over any given point on the work-piece within the range of lateral extension of the spindle housing. After all the spindles are so adjusted to the desired operating position, a new locating plate properly perforated to accommodate the bearings 47 and the studs 43 of the several spindle housings of the head, is applied to the hanger bolts 62, and the nuts 61 and 60 are then applied and drawn up tightly to securely clamp the several spindles in the newly adjusted positions. At will be understood, a different or a modified locating plate 36 will be required for each individual drilling job. That is, the character of the work-piece determines the design of the locating plate, and the spindles are adjusted to the requirements set forth by the design of the locating plate. This may readily be appreciated by referring to Fig. 4, which illustrates in plan a typical rearrangement of tool holders 7, with the spindle housings 32 and drums 12 rotated to various relative positions. Fig. 4, and Fig. 1 as well, indicate that the centers of the several drums are equidistant from the axis of the main shaft 6; however, by incorporating in the head a greater number of gears in the train between the main shaft and the idler shaft 28, any given drum may be located at a different distance from the main shaft axis. This may be accomplished also by changing the sizes of the gears of the train, or by providing take-off gears meshing with any one of the gears of the train. Such modifications may well be considered within the skill of the designer.

The modified form of the device illustrated by Fig. 3 is the same as that of Fig. 1, except for the means employed for clamping the spindle housing in predetermined positions of adjustment. Accordingly, it should be unnecessary to repeat in detail the relationships and functions for the parts which are common to both forms, wherefore such common parts have been given the same reference numerals in Fig. 3, as they carry in Fig. 1, with the numerals primed in Fig. 3. Only the principal parts are numbered in Fig. 3, to generally indicate the correspondency with the same parts in Fig. 1.

It will be noted, with respect to Fig. 3, that the spindle 34' is driven by the main shaft 6' through the agency of the gears 21', 20', 19', 14', 27' and and 46'. The idler shaft 28' carrying the long idler gear 27', passes loosely through the upright bore 35' of the spindle housing 32', and has its upper end 70 pinned or otherwise anchored within the bore 71 of a clamp head 72 (Figs. 3 and 5). The clamp head includes a flange 73 which overlies and abuts a portion of the body member 8', as shown, and to preclude rotation of the clamp head and idler shaft the clamp head may be pinned or otherwise fixed to drum 12', as at 74.

At its lower end, the idler shaft has a thread 75 to engage the threads of a nut 76 recessed in the lower face 63' of the spindle housing. The nut preferably has a socket head 77 to which a suitable wrench may be applied through an opening 78 in the locating plate. A washer for the nut to bear upon, is indicated at 79.

When fixation of the spindle housing is to be effected, the operator need only tighten the nut 76, which causes the spindle housing to be pulled upwardly against the body member 8' and the lower face of drum 12', while at the same time the drum is clamped tightly by the flange 73 of the clamp head bearing against the body member. The upper portion of the spindle housing may be provided with an extending flange 80 to increase the clamping area of said housing, and to enhance the stability thereof during the drilling or tapping operations.

It may be noted that in the Fig. 3 form of the device, the spindle housing is not clamped to the locating plate, as in Fig. 1. However, it is possible to draw up the locating plate into firm clamping contact with the lower face 63' of the spindle housing, by means of nuts 61', if desired. This secondary clamping means is considered unnecessary, however, in actual or normal practice.

To adjust the positions of the spindles in the Fig. 3 type of drill head, the operator loosens the nut 76 of each spindle housing, removes the locating plate 36', and proceeds as was explained in the description of Fig. 1. Different or modified locating plates are required for the different spindle position requirements of particular drilling or tapping jobs. In both forms of the device, it should be noted, the spindle housing at a point directly above the tool holder is adequately backed up by the heavy body member and drum, to avoid the occurrence of any bending or cocking forces resulting from pressure of the tool upon the work-piece. Extreme accuracy of machining is thereby assured.

It is to be understood that various modifications and changes in structural details of the device may be made, within the scope of the appended claims, without departing from the spirit of the invention.

What is claimed is:

1. In a device of the class described, the combination of a heavy plate-like body member having a flat lower face with an enlarged transverse bore therein, a circular drum rotatably mounted in the bore, an idler shaft depending from the drum at a point offset from the axis of rotation of the drum, an idler gear on said shaft, a tool-carrying spindle, a spindle housing in the form of a block abutting the drum, said block having a bore to receive one end of the idler shaft and a second bore to rotationally support the tool-carrying spindle in parallelism with the idler shaft, said spindle housing block being rotatable about the axis of the idler shaft to revolve the spindle bodily about the idler shaft in a circular orbit, said spindle housing block having an upper planar area in flatwise abutment upon the drum and the flat lower face of the body member all around the axis of the spindle, a gear on the spindle in mesh with the idler gear, means including a gear disposed centrally of the drum and meshing with the idler gear, for driving the idler gear and the tool-carrying spindle, and means for holding said spindle housing block in position to locate the tool-carrying spindle relative to a work-piece.

2. In a device of the class described, the combination of a heavy body member having a substantially plane face, and bored transversely to form a drum bearing, a circular drum rotatably mounted in the bore, said drum having a flat face coplanar with the plane face of the body member, an idler shaft depending from the drum face at a point remote from the axis of rotation of the drum, an idler gear on said shaft, a tool-carrying spindle, an adjustable spindle housing having a bore to receive one end of the idler shaft and a second bore to rotationally support the spindle in parallelism with the idler shaft, said spindle housing being rotationally adjustable about the axis of the idler shaft to revolve the spindle bodily about the idler shaft in a circular orbit, said spindle housing having an upper planar area movable into flatwise abutment upon the plane faces of the body member and the drum, a portion of said upper planar area of the spindle housing being disposed substantially about the spindle axis to provide solid backing for the force imposed on the spindle incident to contact of the tool with a work-piece, a gear on the spindle in mesh with the idler gear, means for driving the idler gear and the tool-carrying spindle, and means for holding said spindle housing in various positions of adjustment relative to the body member.

3. In a device of the class described, the combination of a heavy body member having a substantially plane face, and bored transversely through said face to form a drum bearing, a circular drum rotatably mounted in the bore, said drum having a flat face coplanar with the plane face of the body member, an idler shaft depending from the drum face at a point remote from the axis of rotation of the drum, an idler gear on said shaft, a tool-carrying spindle, an adjustable spindle housing having a bore to receive one end of the idler shaft and a second bore in which the spindle rotates in parallelism with the idler shaft, said spindle housing being rotationally adjustable about the axis of the idler shaft to revolve the spindle bodily about the idler shaft in a circular orbit, said spindle housing having an upper planar area movable into flatwise abutment upon the plane faces of the body member and the drum, a gear on the spindle in mesh with the idler gear, means for driving the idler gear and the spindle, and releasable means including the idler shaft for clamping the spindle housing firmly relative to the body member.

4. In a device of the class described, the combination of a heavy body member having a substantially plane face, and bored transversely through said face to form a drum bearing, a circular drum rotatably mounted in the bore, said drum having a flat face coplanar with the plane face of the body member, an idler shaft depending from the drum face at a point remote from the axis of rotation of the drum, an idler gear on said shaft, a tool-carrying spindle, an adjustable spindle housing having a bore to receive one end of the idler shaft and a second bore in which the spindle rotates in parallelism with the idler shaft, said spindle housing being rotationally adjustable about the axis of the idler shaft to revolve the spindle bodily about the idler shaft in a circular orbit, said spindle housing having an upper planar area movable into flatwise abutment upon the plane faces of the body member and the drum, a gear on the spindle in mesh with the idler gear, means for driving the idler gear and the spindle, a rigid spindle locating plate normally fixed relative to the body member in substantial abutment with the spindle housing, and releasable means for clamping the spindle housing securely to said locating plate.

5. In a device of the class described, the combination of a heavy body member having a substantially plane face, and bored transversely through said face to form a drum bearing, a circular drum rotatably mounted in the bore, said drum having a flat face coplanar with the plane face of the body member, an idler shaft depending from the drum face at a point remote from the axis of rotation of the drum, an idler gear on said shaft, a tool-carrying spindle, an adjustable spindle housing in the form of a single block contacting the body member, and having a bore to receive one end of the idler shaft and a second bore in which the spindle rotates in parallelism with the idler shaft, said spindle housing being rotationally adjustable about the axis of the idler shaft while the drum is stationary, to revolve the spindle bodily about the idler shaft in a circular orbit, said spindle housing having an upper planar area movable into flatwise abutment upon the plane faces of the body member and the drum, a gear on the spindle in mesh with the idler gear, means for driving the idler gear and the spindle, and releasable means for clamping the spindle housing firmly relative to the body member.

6. In a device of the class described, the combination of a heavy body member having a substantially plane face, and bored transversely through said face to form a drum bearing, a circular drum rotatably mounted in the bore, said drum having a flat face coplanar with the plane face of the body member, an idler shaft depending from the drum face at a point remote from the axis of rotation of the drum, an idler gear on said shaft, a tool-carrying spindle, an adjustable spindle housing in the form of a single block contacting the body member, and having a bore to receive one end of the idler shaft and a second bore in which the spindle rotates in parallelism with the idler shaft, said spindle housing being rotationally adjustable about the axis of the idler shaft while the drum is stationary, to revolve the spindle bodily about the idler shaft in a circular orbit, said spindle housing having an upper planar area movable into flatwise abutment upon the plane faces of the body member and the drum, a gear on the spindle in mesh with the idler gear, means for driving the idler gear and the spindle, and releasable means for fixing the spindle housing against shifting from its adjusted position.

7. An adjustable multiple spindle head of the character described, comprising in combination, a heavy body member having a substantially flat lower face, a central portion, and a plurality of enlarged bores in the lower face disposed on centers spaced from the central portion of the body member, a circular drum rotatively mounted in each bore, said drums having flat faces coplanar with the flat lower face of the body member, a plurality of rigid one-piece tool spindle housings each mounted eccentrically upon a drum for swinging adjustment relative to the drum in physical contact with its drum and with an adjacent area of the body member lower face, whereby a portion of the drum and a portion of the body member are spanned by the tool spindle housing in contact therewith, a tool-carrying spindle rotatably supported by each spindle housing, drive means for simultaneously rotating all of the spindles, and releasable means for maintaining the tool spindle housings in fixed positions of adjustment relative to the body member.

8. An adjustable multiple spindle head of the character described, comprising in combination, a heavy body member having a substantially flat lower face, a central portion, and a plurality of enlarged bores in the lower face disposed on centers spaced from the central portion of the body member, a circular drum rotatively mounted in each bore, said drums having flat faces coplanar with the flat lower face of the body member, a plurality of rigid one-piece tool spindle housings each mounted eccentrically upon a drum for swinging adjustment relative to the drum in physical contact with its drum and with an adjacent area of the body member lower face, whereby a portion of the drum and a portion of the body member are spanned by the tool spindle housing in contact therewith, an apertured locating plate releasably fixed relative to the body member in substantial parallelism therewith, a tool-carrying spindle rotatably supported by each spindle housing and passing through a locating plate aperture, releasable means for maintaining the tool spindle housings in fixed positions of adjustment relative to said locating plate, and drive means for rotating at least some of said spindles.

9. An adjustable multiple spindle head of the character described, comprising in combination, a heavy body member having a substantially flat lower face, a central portion, and a plurality of enlarged bores in the lower face disposed on centers spaced from the central portion of the body member, a circular drum rotatively mounted in each bore, said drums having flat faces coplanar with the flat lower face of the body member, a plurality of adjustable tool spindle housings each mounted eccentrically upon a drum for swinging movement in physical contact with its drum and with an adjacent area of the body member lower face, whereby a portion of the drum and a portion of the body member are spanned by the tool spindle housing in contact therewith, an apertured locating plate releasably fixed relative to the body member in substantial parallelism therewith, a tool-carrying spindle rotatably supported by each spindle housing and passing through a locating plate aperture, drive means for rotating at least some of said spindles, and releasable means for clamping the spindle housings firmly to said locating plate.

10. An adjustable multiple spindle head of the character described, comprising in combination, a heavy body member having a substantially flat lower face, a central portion, and a plurality of enlarged bores in the lower face disposed on centers spaced from the central portion of the body member, a circular drum rotatively mounted in each bore for movement to predetermined positions of adjustment, a plurality of adjustable tool spindle housings each pivotally mounted upon a drum remotely from the center of the latter, a tool-carrying spindle supported by each spindle housing at a point remote from the pivotal mounting aforesaid, and means including a main shaft rotatively supported upon the body member, for actuating said spindles.

11. An adjustable multiple spindle head of the character described, comprising in combination, a heavy body member having a substantially flat lower face, a central portion, and a plurality of enlarged bores in the lower face disposed on centers spaced from the central portion of the body member, a circular drum rotatively mounted in each bore for movement to predetermined positions of adjustment, a plurality of adjustable tool spindle housings each pivotally mounted upon a drum remotely from the center of the latter, an apertured locating plate removably fixed relative to the body member in substantial parallelism therewith, a tool-carrying spindle supported by each spindle housing and passing through a locating plate aperture, releasable means for maintaining the spindle housings in fixed positions of adjustment relative to said locating plate, and means for actuating at least some of said spindles.

12. An adjustable multiple spindle head of the character described, comprising in combination, a heavy body member having a substantially flat lower face, a central portion, and a plurality of enlarged bores in the lower face disposed on centers spaced from the central portion of the body member, a circular drum rotatively mounted in each bore for movement to predetermined positions of adjustment, a plurality of adjustable tool spindle housings each pivotally mounted upon a drum remotely from the center of the latter, an apertured locating plate removably fixed relative to the body member in substantial parallelism therewith, a tool-carrying spindle supported by each spindle housing and passing through a locating plate aperture, releasable means for firmly clamping the spindle housings to said locating plate, and means for actuating at least some of said spindles.

13. An adjustable tool head for application to a reciprocable ram-like element of a machine, comprising in combination, a body member for attachment to the ram-like element, a rotatable member mounted upon the body member for movement to different positions of adjustment thereon, an adjustable tool-supporting element, and means pivotally mounting the tool-supporting element upon the rotatable member at a point remote from the axis of rotation of the latter, and means mounting a tool upon the tool-supporting element at a point remote from the mounting pivot aforesaid.

14. In a device of the class described, the combination of a heavy plate-like body having a transverse bore therein, a rotationally adjustable member in said bore, an idler shaft depending from said rotationally adjustable member at a point offset from the axis of rotation thereof, an idler gear on said shaft, a tool-carrying spindle, a spindle housing revolvable about the idler shaft, with the spindle offset from the idler shaft and disposed at right angles to the plate-like body of the device, means for driving the idler gear and the spindle, and means providing a solid backing between the spindle and said plate-like body, to avoid cocking of the spindle from its right-angular relationship with the plate-like body as force is applied axially to the spindle incident to movement thereof toward a work-piece.

15. An adjustable tool head for application to a reciprocable ram-like element of a machine, comprising in combination, a body member for attachment to the ram-like element, a rotatable member mounted upon the body member for movement to different positions of rotary adjustment thereon, an adjustable tool-supporting element having an upper face to substantially flatly contact and bear directly upon the body member, means pivotally mounting the tool-supporting element upon the rotatable member at a point remote from the axis of rotation of the latter, and means mounting a tool upon the tool-supporting element at a point remote from the mounting pivot aforesaid.

16. An adjustable tool head for application to a reciprocable ram-like element of a machine, comprising in combination, a body member for attachment to the ram-like element, a rotatable member mounted upon the body member for movement to different positions of rotary adjustment thereon, an adjustable tool-supporting element having an upper face to substantially flatly contact and bear directly upon the body member, means pivotally mounting the tool-supporting element upon the rotatable member at a point remote from the axis of rotation of the latter, and means mounting a tool upon the tool-supporting element, with the axis of the tool striking the body member within the area of bearing-contact of the tool-supporting element upon the body member.

17. An adjustable tool head for application to a reciprocable ram-like element of a machine, comprising in combination, a body member for attachment to the ram-like element, a rotatable member mounted upon the body member for movement to different positions of rotary adjustment thereon, an adjustable tool-supporting element having an upper face to substantially flatly contact and bear directly upon the body member, means pivotally mounting the tool-supporting element up on the rotatable member at a point remote from the axis of rotation of the latter, and means mounting a tool upon the tool-supporting element, with the axis of the tool striking the body member within the area of bearing contact of the tool-supporting element upon the body member, a tool-supporting element locating member normally fixed relative to the body member, and means for selectively anchoring the tool-supporting element to said locating member.

ALFRED P. SPECKIN.

REFERENCES CITED

The following references are of record in the file of this patent:

UNITED STATES PATENTS

| Number | Name | Date |
|---|---|---|
| 2,441,722 | Schultz | May 18, 1948 |